United States Patent [19]

Weinstein et al.

[11] 4,082,882
[45] Apr. 4, 1978

[54] FIBERGLASS REINFORCED PLYWOOD STRUCTURAL SANDWICH WITH ACRYLIC FACING ON ONE OR BOTH SIDES THEREOF

[75] Inventors: Hyman Weinstein, Cherry Hill, N.J.; Kurt Adler, Erdenheim, Pa.

[73] Assignee: Delta Truck Body Company, Inc., Montgomeryville, Pa.

[21] Appl. No.: 604,433

[22] Filed: Aug. 13, 1975

[51] Int. Cl.² .............................................. B32B 7/00
[52] U.S. Cl. .................................. 428/246; 156/285; 264/101; 264/257; 296/31 P; 428/251; 428/257; 428/483; 428/511; 428/537
[58] Field of Search ............... 428/110, 111, 228, 251, 428/442, 246, 441, 502, 511, 483, 500, 537, 257; 156/285, 286, 332, 334; 52/309; 296/31 P; 264/101, 257, 258, 263

[56] References Cited

U.S. PATENT DOCUMENTS

| | | | |
|---|---|---|---|
| 3,276,905 | 10/1966 | Porter | 428/502 |
| 3,454,454 | 7/1969 | Sterman et al. | 428/251 |
| 3,509,002 | 4/1970 | Edwards et al. | 296/31 P |
| 3,522,138 | 7/1970 | Lee | 428/251 |
| 3,707,434 | 12/1972 | Stayner | 428/483 |
| 3,720,540 | 3/1973 | Wimmer | 428/483 |
| 3,788,941 | 1/1974 | Kupits | 428/511 |
| 3,869,341 | 3/1975 | Gotoda et al. | 428/511 |

FOREIGN PATENT DOCUMENTS

| | | | |
|---|---|---|---|
| 2,096,943 | 3/1972 | France | 428/537 |

Primary Examiner—James J. Bell
Attorney, Agent, or Firm—Max R. Millman

[57] ABSTRACT

A structural sandwich for use as a truck, trailer, van or intermodal container wall and method of making the same. The sandwich comprises a fiberglass reinforced plywood plastic unit having one or both facings which are in the form of a sheet or film of a high-impact, weather-resistant, low-haze, non-brittle, substantially non-porous acrylic composition, the unit being made into an integrated sandwich of 20 foot lengths or more by an efficient vacuum molding method.

6 Claims, 10 Drawing Figures

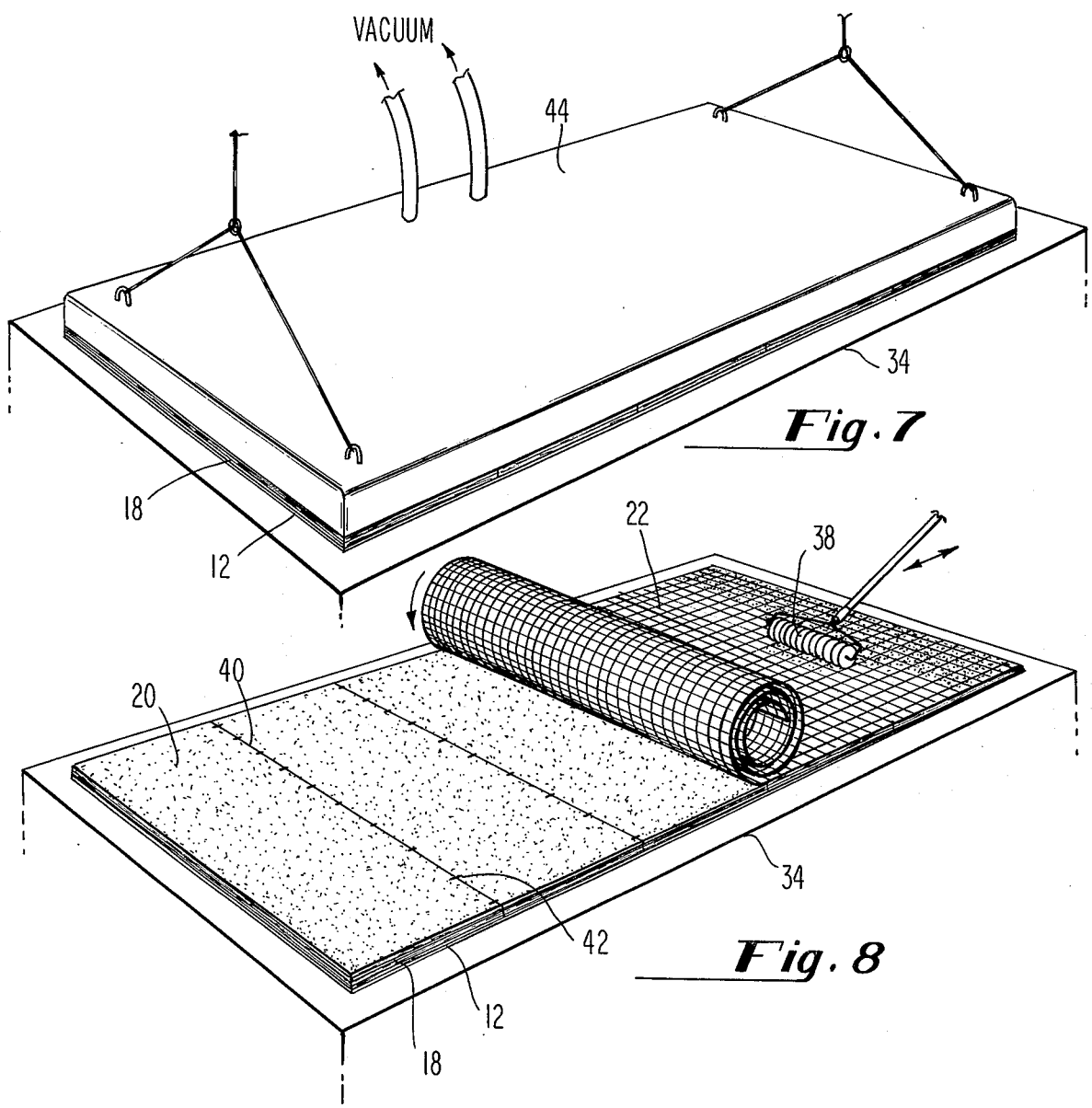
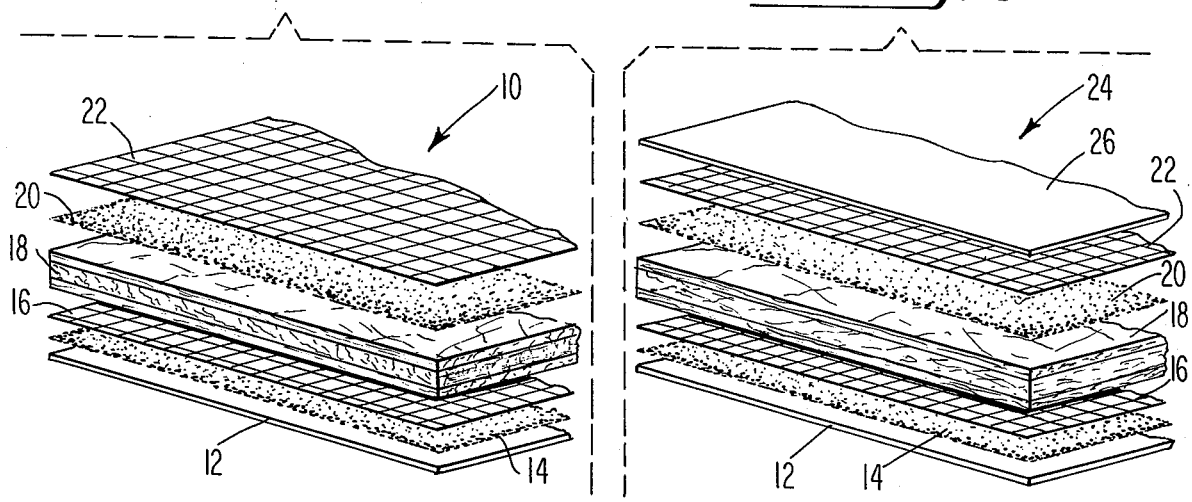

FIBERGLASS REINFORCED PLYWOOD STRUCTURAL SANDWICH WITH ACRYLIC FACING ON ONE OR BOTH SIDES THEREOF

This invention relates to structural sandwich members for use in construction of truck, trailer and van bodies and intermodal containers and the like.

Over the past several years fiberglass reinforced plastic plywood (known in the trade as FRP) has been in relatively widespread use for the construction of truck, trailer and van bodies and intermodal container walls primarily because of its strength and rigidity and the walls can be retained by peripheral framing instead of longitudinally spaced vertical support posts.

The conventional fiberglass reinforced plastic plywood sandwich consists essentially of a layer of gel coat, a standard generally white pigmented composition comprised of polyester-orthophthalic polymer resin and additives, a layer of general purpose resin comprised of a polymer of propylene glycol, maleic anhydride and phthalic anhydride and additives, a layer of fiberglass on the resin, plywood on the fiberglass, general purpose resin on the plywood and another layer of fiberglass on the resin, the entire unit becoming, in the processing thereof, an integrated composite unit. For application as a wall of a truck, trailer, van or intermodal container, the outer facing or layer is the white gel coat.

The conventional fiberglass reinforced plywood sandwich possesses certain disadvantages. Thus, the outer gel coat layer or face is porous and brittle, is subject to marring, frequently cracks especially where bolts or fasteners extend therethrough and does not wash too well.

It is the primary object of this invention to provide a fiberglass reinforced plywood sandwich which overcomes the aforementioned disadvantages.

Another object of the invention is to provide a fiberglass reinforced plywood sandwich in which the outer gel coat layer is replaced with a sheet or film of high-impact, weather-resistant, low-haze, acrylic composition which is integrated in the structure and which is not porous and brittle, but rather somewhat flexible, and is esthetically more attractive than the gel coat.

Another object of the invention is to provide a fiberglass reinforced plywood sandwich in which both the outer faces thereof are comprised of a sheet or film of high-impact, weather-resistant, non-brittle, non-porous, low-haze, acrylic composition which is integrated in the sandwich structure.

Yet another object of the invention is to provide a unitary wall structure for a truck, trailer or van body or intermodal container made solely of a fiberglass reinforced plywood sandwich in which is integrated as one or both facings a sheet or film of an impact-resistant, weather-resistant, mar-resistant, crack-resistant, substantially non-porous smooth, low-haze acrylic composition.

Certain disadvantages are encountered in the lay-up and manufacture of 20 or 40 foot sidewalls from conventional fiberglass reinforced plywood panels. Thus, there is the need to scrape considerable amounts of gel coat from the long lay-up table each time a new sidewall sandwich is prepared. Additionally, with gel coat as the outer layer, no masking can be effected.

It is therefore another object of this invention to provide a novel method of making fiberglass reinforced sandwiches of length sufficient to provide truck, trailer, van or intermodal container support walls, in which one or both facings thereof comprise a sheet or film of an impact-resistant, weather-resistant, non-porous acrylic composition integrated therein.

These and other objects of the invention will become more apparent as the following description proceeds in conjunction with the accompanying drawings wherein:

FIG. 7 is a diagrammatic perspective view of the sixth step;

FIG. 8 is a diagrammatic perspective view of the seventh step;

FIG. 9 is a fragmentary exploded perspective view of the new sandwich of the instant invention with one acrylic face made in accordance with the sequence of steps illustrated in FIGS. 2–8; and FIG. 10 is a view similar to FIG. 10 of the new sandwich with two acrylic faces.

Specific reference will now be made to the drawings in which similar reference characters are used for corresponding elements throughout.

Figure 1:
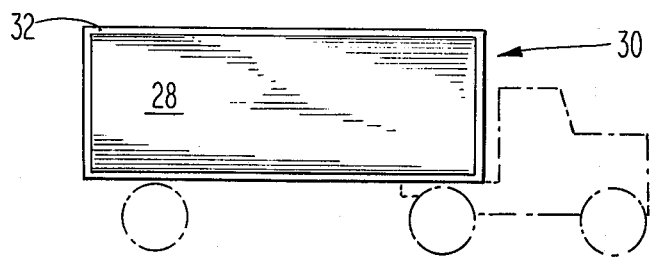
FIG. 1 is a side view of a truck body whose support walls are constructed in accordance with the instant invention.

Referring first to FIG. 9, the structural sandwich 10 comprises an outer layer 12 of a high-impact, weather-resistant, non-brittle, substantially non-porous acrylic composition in the form of a sheet, generally in the order of thickness of 0.030 to 0.040 inch or a film in the order of thickness of 1 to 3 mil, then a layer of a general purpose resin 14 into which is embedded a sheet of fiberglass 16, then a core of plywood 18 which by vacuum processing bonds the acrylic layer 12, resin layer 14, fiberglass layer 16 and plywood core 18 together. Another layer 20 of general purpose resin is then spread over the plywood core into which a final layer 22 of fiberglass is embedded and allowed to set to complete the sandwich unit, the resin layer 20 coating the fiberglass layer 22 and becoming the inner layer of the composite integrated sandwich.

In the structural sandwich 24 shown in FIG. 10, the same superimposed layers of acrylic 12, general purpose resin 14, fiberglass layer 16, plywood core 18, resin layer 20 and fiberglass layer 22 are provided except that a final inner layer 26 of a high-impact, weather-resistant, non-brittle substantially non-porous acrylic composition sheet or film, such as that used for the outer layer 12, is placed over the embedded fiberglass layer 22 and the entire unit is integrated as a bonded composite unit by vacuum processing.

The structural sandwich unit 10 of FIG. 9 or 24 of FIG. 10 is made up, as will appear hereinafter, into unitary lengths of 20 feet or more to become the support walls 28 of a truck, trailer or van body or intermodal container 30. Because of their structural integrity and strength the walls 28 need be retained only by peripheral framing 32.

The layers 12 and 26 in sheet form are extrusions of a blend of an alkyl methacrylate polymer having all acrylic multiple stage modifiers, the polymer being sequentially produced characterized by a non-elastic hard first stage, an intermediate elastomeric stage and a final relatively hard stage as disclosed in the Owens U.S. Pat. No. 3,793,402 which is incorporated by reference and available in particulate form from Rohm & Haas Company, Philadelphia, Pa. as Plexiglas DR. In film form, layers 12 and 26 are extrusions of multiple stage acrylic polymers in which the polymer particles have rubbery cross-linked cores of alkyl acrylates at least partially sheathed by harder copolymer sheaths of alkyl acrylates and alkyl acrylates with some penetration between the layers as disclosed in the Ryan U.S. Pat. No. 3,562,235 which is incorporated by reference and is available as film from Rohm & Haas Company as Korad.

The general purpose resin 14 and 20 to embed and cover the fiberglass and cause adhesion thereof to the plywood core is commercially available from various sources. One such resin is general resin No. 92347 made by Reichhold Chemical Co., Elizabeth, N.J., and is a composition comprised of a polymer of propylene glycol, maleic anhydride and phthalic anhydride, styrene monomer, an organic dye and curing promoters. It has a viscosity of 300–400 cps at 77° F (25° C) LVS Brookfield viscometer, #3 spindle, 60 rpm, a gel time of 12–17 mins. at 77° F with 1% methylethylketone (MEK) peroxide catalyst and a total cure time of 21–30 mins. at 77° F using a 100 gm mass containing 1% MEK peroxide.

The fiberglass layers 16 and 22 can be mats of crossed fiber or woven roving with a waffle pattern as shown in the drawings, the latter being preferred.

Figure 2:
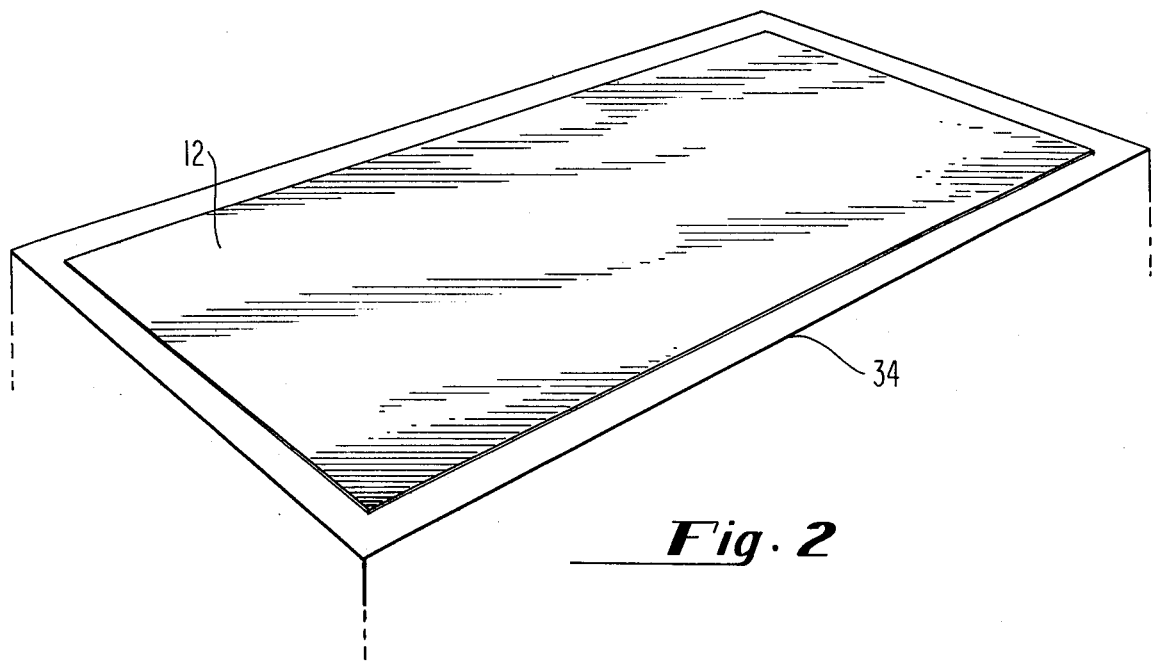
FIG. 2 is a diagrammatic perspective view of the first step in the method of making the instant invention.
Figure 3:
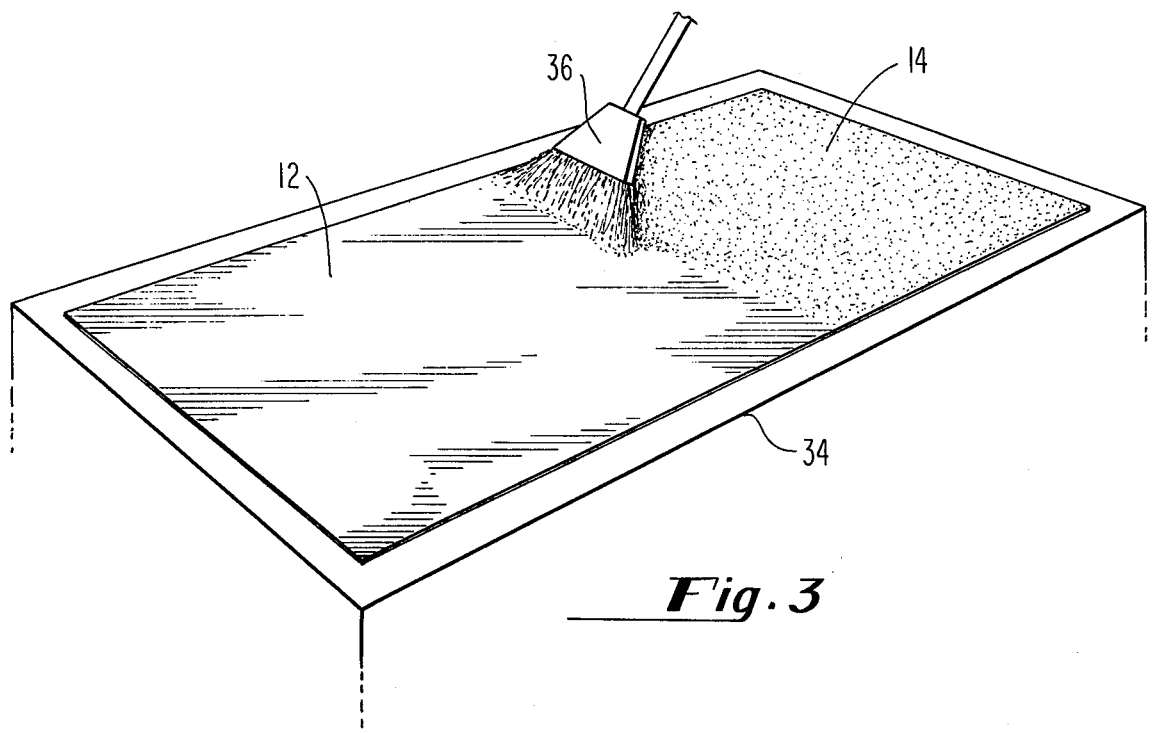
FIG. 3 is a diagrammatic perspective view of the second step.
Figure 4:
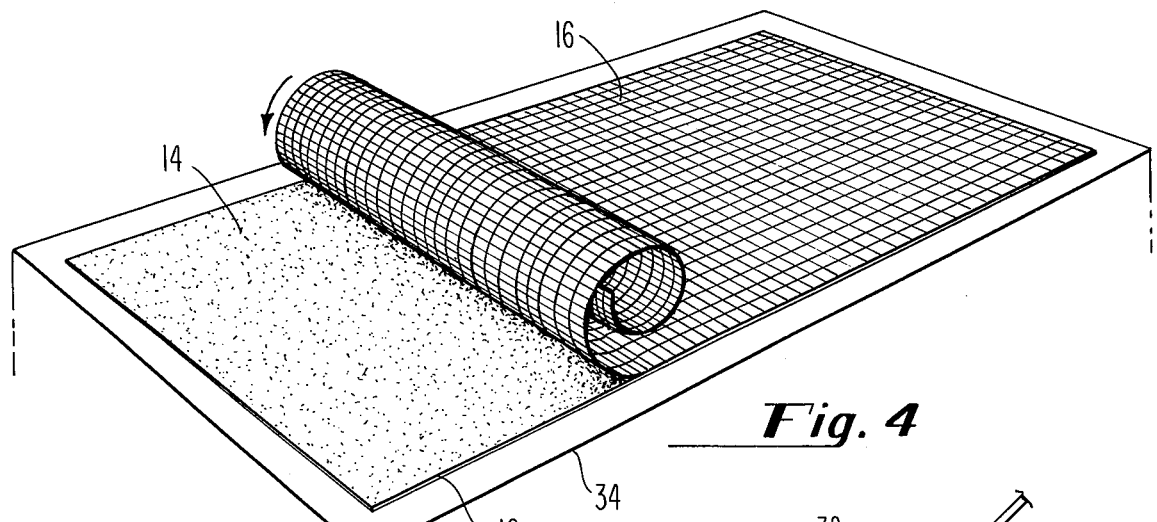
FIG. 4 is a diagrammatic perspective view of the third step.
Figure 5:
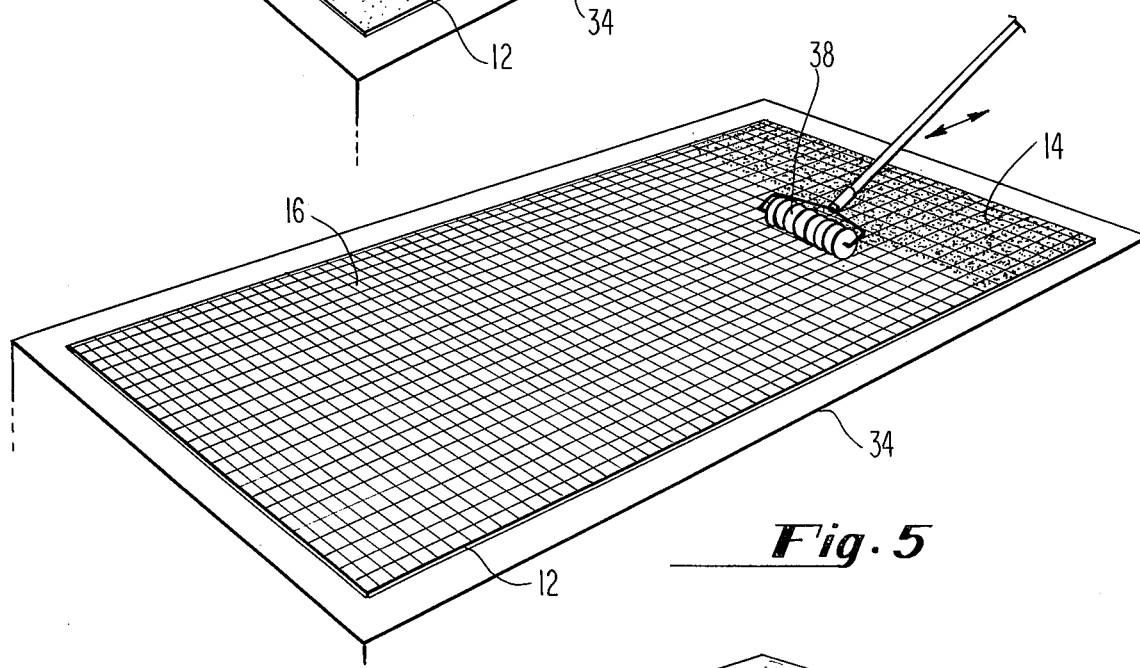
FIG. 5 is a diagrammatic perspective view of the fourth step.
Figure 6:
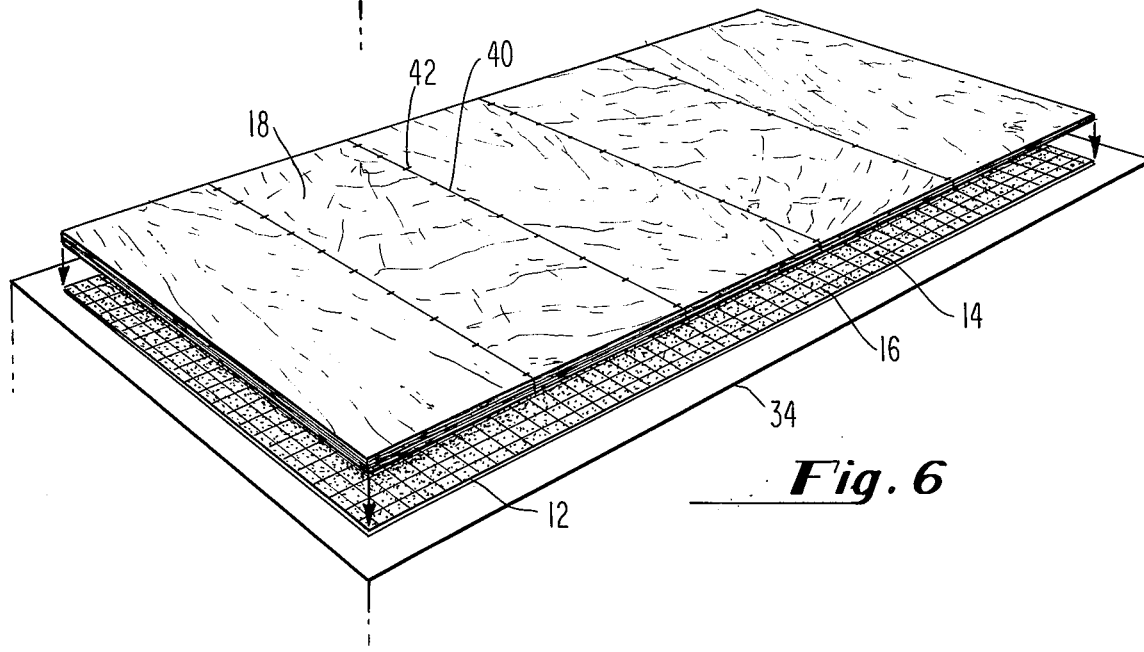
FIG. 6 is a diagrammatic perspective view of the fifth step.

The method of making the structural sandwich of the instant invention will now be described with reference to FIGS. 1–8.

The sheet or film 12 of the afore-described acrylic composition is placed on a flat lay-up table 34 and, if desired, may be masked (not shown) along its longitudinal edges. Over the entire surface of the sheet 12 is sprayed, by a traveling spray head 36, the general purpose resin 14. The spray head delivers a mixture of the resin and the MEK peroxide catalyst ($\frac{1}{2}$ to $1\frac{1}{2}$% based on the weight of the resin), the resin preferably containing white pigment.

The fiberglass 16 is then rolled out over the entire surface of the resin and a ribbed roller 38 is used to spread and squeegee the resin through the interstices of the fiberglass and over the top thereof. Thereafter, plywood panels 18, generally 4 × 6–8 feet × $\frac{3}{8}$ inch, are laid over the resin for the full length of the unit and the abutting edges 40 of the plywood panels are preferably stapled as at 42 to retain them in assembled form. A vacuum plate 44 is then placed over the acrylic, resin, fiberglass and plywood assembly and under a vacuum of 10 psi for about 1–1$\frac{1}{2}$ hours and at room temperature (about 72° F) the entire unit is set and laminated.

If desired, the sandwich containing the acrylic layer 12, the single ply of fiberglass 16 embedded in the resin 14 and the single core of plywood 18 may be employed as the end product for a supporting truck, trailer, van or container wall, in which case the acrylic layer is the outer face and the exposed surface of the plywood is the inner face of the wall.

It is preferred, however, that the unit be reinforced with another fiberglass ply 22 and finished with the white pigmented resin 20, in which case, as seen in FIG. 8, after the unit is vacuum formed, a layer of the general purpose resin 20 is sprayed onto the plywood, another layer or ply of fiberglass 22 is rolled out over the resin 20, the resin is spread and squeegeed with a ribbed roller 38 over the entire surface of the fiberglass and allowed to set at room temperature (about 72° F). Thus, in this sandwich the outer face is acrylic, the inner face is the resin coating the fiberglass.

To make the sandwich shown in FIG. 10 with acrylic facing on both sides thereof, the same procedure as that described hereinbefore is followed except that another sheet or film 26 of the aforementioned acrylic composition is placed over the fiberglass ply 22 into and over which the resin is squeegeed, and the entire assembly is then subjected to a vacuum of about 10 psi for about 1$\frac{1}{2}$ hours to form the laminate.

As stated hereinbefore, fiberglass reinforced plastic (FRP) plywood is presently used to construct structural walls of truck, trailer and van bodies. The conventional FRP plywood is a sandwich having an outer face of gel coat, then resin, a first ply of fiberglass, a core of plywood, a second ply of fiberglass and a final inner face of pigmented resin which covers the second ply of fiberglass. The gel coat is a standard white pigmented (titanium dioxide) orthophthalic polyester resin with styrene monomer and thixotropic agents. It is commercially available from various sources such as white Gel Coat (V-30011 from Ferro Corp. of New Jersey and is a liquid of 10.8–11.0 lbs./gal., has a viscosity of 5500 cps at room temperature and a shelf life generally of about 90 days.

In the instant invention, the gel coat of the conventional product is eliminated and is replaced with a sheet or film 12 and/or 16 of high-impact, weather-resistant, low-haze (or craze) non-brittle acrylic composition as described hereinbefore. In the conventional FRP plywood wall the gel coat is the outer face. It is porous and subject to ready marring, thereby presenting difficulties in washing the same and keeping it clean. It is quite brittle and therefore frequently cracks especially where bolts or fasteners extend through it as at the attachment of the perimeter framing. It has low impact resistance and its esthetic appearance leaves much to be desired.

On the other hand the acrylic-clad FRP plywood wall is esthetically more attractive, the acrylic surface has high impact strength, is non-porous, non-brittle, weather resistant, has low haze and low craze and is easy to wash and keep clean.

Applicant is aware of the fact that an attempt has been made to provide lighter weight structural walls for truck, trailer, van and intermodal container walls. One such is sold under the trademark Xentex by the Xentex Company, a division of Exxon Enterprises, Inc., Londonderry, N.H. From the Xentex literature, it appears that the panels are self-skinning foam with fiberglass filaments placed in the foam and surface finishes such as paint, ABS, polyvinyl fluoride and acrylic. Because it is a foam, and therefore contains no plywood core, its structural integrity and load support characteristics are not as good as the FRP plywood sandwich and not as good as the acrylic-clad FRP plywood sandwich of the instant invention.

Thus, the present acrylic-clad FRP plywood sandwich of the instant invention and method of making the same provide a high-impact, non-porous, non-brittle, weather-resistant structural sound sandwich especially useful for the construction of truck, trailer, van and intermodal container body walls which improves the attractiveness, unkeep and life of these bodies and represents a decided improvement over those structural walls now in use.

While preferred embodiments of the invention have here been shown and described, it will be understood that skilled artisans may make minor variations without departing from the spirit of the invention.

What is claimed is:

1. A sandwich for use as a structural wall of a truck, trailer, van or intermodal container comprised of a consolidated unit including a layer in the form of a sheet of an alkyl methacrylate polymer having all acrylic multiple stage modifiers, the polymer being sequentially produced and characterized by a non-elastomeric hard first stage, an intermediate elastomeric stage and final relatively hard stage, a polyester resin bonded to said acrylic sheet, a ply of fiberglass in the form of a waffle weave of woven roving embedded in and covered by said resin and plywood bonded to said resin on the side of said fiberglass opposite said layer of acrylic composition.

2. The sandwich of claim 1 wherein said resin is a catalyzed composition including a polymer of propylene glycol, maleic anhydride and phthalic anhydride, styrene monomer and curing promoters.

3. The sandwich of claim 1 and a layer of pigmented resin over said plywood and a further ply of fiberglass in the form of a waffle weave of woven roving embedded in and covered by said resin.

4. The sandwich of claim 3 and a further acrylic sheet over said further ply of fiberglass and consolidated therewith in the resin covering said further ply of fiberglass.

5. A sandwich for use as a structural wall of a truck, trailer, van or intermodal container comprised of a consolidated unit including a layer in the form of a film of multiple stage acrylic polymers in which the polymer particles have rubbery cross-linked cores of alkyl acrylates at least partially sheathed by harder copolymer sheaths of alkyl acrylates with some penetration between the layers, a polyester resin bonded to said acrylic film, a ply of fiberglass in the form of a waffle weave of woven roving embedded in and covered by said resin and plywood bonded to said resin on the side of the fiberglass opposite said layer of acrylic film.

6. A method of making a sandwich for use as a structural wall of a truck, trailer, van or intermodal container comprised of applying a polyester resin to a sheet or film of a high-impact, non-brittle, non-porous, weather-resistant acrylic composition, said sheet being made of an alkyl methacrylate polymer having all acrylic multiple stage modifiers, the polymer being sequentially produced and characterized by a non-elastomeric hard first stage, an intermediate elastomeric stage and final relatively hard stage, said film being made of multiple stage acrylic polymers in which the polymer particles have rubbery cross-linked cores of alkyl acrylates at least partially sheathed by harder copolymer sheaths of alkyl acrylates with some penetration between the layers, embedding a ply of fiberglass in the form of a waffle weave of woven roving in said resin, placing plywood against said resin on the side of the plywood opposite the acrylic sheet or film and applying vacuum to the composite unit at room temperature until a consolidated laminated sandwich is produced.

* * * * *